United States Patent Office 3,400,157
Patented Sept. 3, 1968

3,400,157
PRODUCTION OF BIS[BETA(N,N-DIMETHYL-AMINO)ALKYL]ETHERS
Fedor Poppelsdorf, Charleston, W. Va., assignor to Union Carbide Corporation, a corporation of New York
No Drawing. Filed Nov. 27, 1964, Ser. No. 414,454
6 Claims. (Cl. 260—584)

ABSTRACT OF THE DISCLOSURE

Bis[beta(N,N - dimethylamino)alkyl]ethers are produced from bis(beta-haloalkyl)ethers by reaction with trimethylamine to form the bis-methohalide of bis[beta (N,N - dimethylamino)alkyl]ether and subsequently reacting the latter compound with dimethylamine to form the desired ether product. The bis[beta(N,N-dimethyl-amino)alkyl]ethers are useful as catalysts for the reaction of organic isocyanates with water and with alcohols.

The invention relates to a process for producing amines, and particularly, to a process for producing bis[beta(dimethylamino)alkyl]ethers. In one aspect, the invention relates to the reaction of bis(beta-haloalkyl)ether with trimethylamine to produce the bis-methohalide of bis[beta(dimethylamino)alkyl]ether. In another aspect, the invention relates to the reaction of dimethylamine with the bis-methohalide of bis[beta(dimethylamino)alkyl]ether to produce bis[beta(dimethylamino)alkyl]ether.

The bis[beta(dimethylamino)alkyl]ethers have been found to be particularly useful as catalysts for the reaction of organic isocyanates with water and with alcohols. Such reactions are widely employed commercially in the production of polyurethane products such as urethane foams. Heretofore, the best method for producing such ethers was the Williamson-type synthesis whereby, for instance, sodium 2-(N,N-dimethylamino)ethoxide was reacted with 1 - chloro - 2 - (N,N-dimethylamino)ethane to produce bis[2 - (N,N - dimethylamino)ethyl]ether. This process is not economical because of the multiplicity of reaction steps which increase handling costs and material losses incurred in handling; the use of relatively expensive reagents, such as metallic sodium, and the need for expensive and/or corrosion resistant equipment. Special handling facilities are needed for using metallic sodium, and the production of 1 - chloro - 2 - dimethylamino-ethane requires expensive corrosion-resistant equipment suitable for handling thionyl chloride, hydrogen chloride, and the amine hydrochloride. Further, the free amine, 1-chloro-2-dimethylaminoethane, is a vesicant which requires special handling. A more economical process for the production of these ethers was therefore desirable in order to facilitate commercialization. The present invention provides such an economical process for producing bis[beta(dimethylamino)alkyl]ethers.

The present invention provides a process that has two novel reaction steps. The first reaction step comprises reacting trimethylamine with a bis(beta-haloalkyl)ether to the bis - methohalide of bis[beta(N,N - dimethylamino) alkyl]ether. Such ethers, which are quaternary ammonium halides, have biological activity (for instance they are ganglion blocking agents), and therefore are useful per se, as well as being useful as a reactant in the second novel reaction step of the invention. The second reaction step of the invention comprises reacting dimethylamine with the bis - methohalide of bis[beta(N,N - dimethyl-amino)alkyl]ether to produce bis[beta(N,N - dimethyl-amino)alkyl]ether.

The first reaction step of the invention comprises reacting trimethylamine with bis(beta-haloalkyl)ether. This reaction can be depicted as follows:

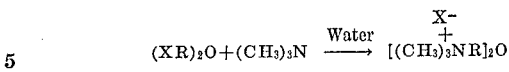

wherein X represents halo, and wherein each R individually represents 1,2-ethylene (i.e., —CH$_2$CH$_2$—) or 2,3-propylene [i.e., —CH$_2$CH(CH$_3$)—]. This reaction is carried out in an aqueous medium, and is virtually quantitative.

The bis(beta-haloalkyl)ethers that are employed include bis(2 - chloroethyl)ether, bis(1-methyl-2-chloroethyl)ether, 2-chloroethyl 1-methyl-2-chloroethyl ether, bis (2-bromoethyl)ether, bis(2-iodoethyl)ether, and the like. The bis(beta-chloroalkyl)ethers are preferred, and bis(2-chloroethyl)ether is more preferred.

The proportions of the reactants are not narrowly critical. Generally, at least 2 moles of trimethylamine per mole of bis(beta-haloalkyl)ether are employed. Large excesses of trimethylamine can be employed, if desired, however, it is rare that more than about 20 moles of trimethylamine per mole of bis(beta-haloalkyl)ether will be employed. Preferred proportions are from about 3 to about 10 moles of trimethylamine per mole of bis(beta-haloalkyl)ether.

A major point of novelty of the first reaction step is the use of water as a solvent for the reaction. It is reported in the literature [Fakstorp et al., Acta Chem. Scand., 7, 134 (1953)] that attempts have been made to react trialkylamine with bis(2-chloroethyl)ether in ethanol or in isopropyl alcohol, but only "a very small amount of crystalline material" was obtained. The same reference discloses that trimethylamine was reacted with bis(2-iodoethyl)ether in an ethanol reaction medium to form the bis-methoiodide of bis[2-(N,N-dimethylamino) ethyl]ether in 32 percent yield. Thus, when alcohol solvent is used for the reaction, the bis(2-chloroethyl) ether gave only a very small yield of product and the much more expensive iodo compound had to be used. Even with the iodo compound, the yield was only 32 percent. However, when water is employed as the reaction medium in accordance with this invention, the yield is virtually 100 percent even with the inexpensive chloro compound that gave practically no product at all when the reaction was carried out in accordance with the prior art.

The concentration of the reactants in the aqueous reaction medium can vary widely. For example, the concentration of the reactants can vary from about 5 weight percent, and lower, to about 90 weight percent, and higher, based on total weight of reaction mixture. It is preferred that the concentration of the reactants be within the range of from about 25 to about 75 weight percent, based on weight of reaction mixture.

The reaction temperature can be varied over a wide range, for instance, from about 0° C. to about 100° C., or higher. Moderately elevated temperatures are preferred, such as from about 25° C. to 75° C., and more preferably from about 40° C. to about 60° C.

The reaction time is dependent, in part, upon factors such as temperature, proportion of reactants, and the like. The period of time sufficient to produce the quaternary ammonium compound will usually be found within the range of from about 1 hour to about 100 hours, and preferably from about 5 hours to about 25 hours.

The reaction pressure is not narrowly critical, and will ordinarily be autogenous. The factors that determine the pressure are primarily reaction temperature and concentration of trimethylamine. Ordinarily, pressures of from about 0 p.s.i.g. to about 100 p.s.i.g. will be encountered.

The reaction equipment employed can be standard reactors equipped with agitator, heat transfer means, and the like. The material of construction can be stainless steel, glass, and the like.

The bis-methohalide product of the first novel reaction step can be recovered by conventional means. For instance, the excess trimethylamine can be removed by vacuum distillation. The water can also be removed, if desired although it is not necessary to isolate the bis-methohalide from the aqueous medium if the product is to be employed as a reactant in the second novel reaction step of the invention. However, the bis-methohalide can be isolated by distillation of the water. When the product is the bis-methochloride, mild evaporation conditions (i.e., vacuum and temperatures below 100° C.) will yield the hemihydrate thereof. Evaporation temperatures in excess of 100° C. will yield the anhydrous bis-methochloride.

The second reaction step of the invention comprises reacting dimethylamine with bis-methohalide of bis[beta (dimethylamino)alkyl]ether to produce bis[beta(N,N-dimethylamino)alkyl] ether. This reaction can be depicted as follows:

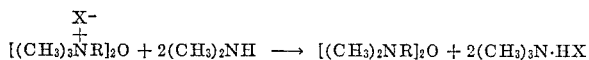

wherein each R individually represents —CH₂CH₂— or —CH₂CH(CH₃)— and wherein X represents halo.

The proportion of dimethylamine to bis-methohalide can be varied widely. Some product will be produced at proportions wherein either reactant is in stoichiometric excess. In general, however, it is preferred to employ at least 2 moles of dimethylamine per mole of bis-methohalide, up to about 10 moles, or more, of dimethylamine per mole of bis-methohalide. The most preferred proportions are from about 4 to about 5 moles of dimethylamine per mole of bis-methohalide.

The reaction can be conducted with or without solvent. It is preferred, however, to employ a polar liquid reaction medium such as water, ethylene glycol, N,N-dimethylformamide, dimethyl sulfoxide, and the like. The most preferred reaction medium is water. The concentration of the reactants in the reaction medium can be varied over a wide range, for instance, from about 5 weight percent, and lower, to about 90 weight percent, and higher, and preferably from about 25 to about 75 weight percent, based on total weight of reaction mixture.

The reaction is normally carried out at elevated temperatures, for example, from about 75° C. to about 300° C. Preferred reaction temperatures are within the range of from about 140° C. to about 200° C., and more preferably from about 150° C. to about 185° C.

Super-atmospheric pressures are preferably employed for the reaction. For example, it is desirable to carry out the reaction at pressures of at least 50 p.s.i.g. More preferably, the reaction is carried out at pressures of from about 200 to 300 p.s.i.g. Even higher pressures can be used, if desired, but may not be economical because more expensive reaction equipment may be required. Most preferably, the reaction pressure is autogeneous, and is determined by the temperature and the vapor pressure of the reactants at that temperature.

The reaction is continued for a period of time sufficient to produce bis[beta(N,N - dimethylamino)alkyl]ether. The exact reaction time employed is dependent, in part, upon factors such as temperature, nature and proportion of solvent and reactants, and the like. The reaction time will normally be within the range of from about one-half to about 100 hours or more, and preferably from about one to about ten hours.

The reaction equipment can be an autoclave having conventional heat transfer means, agitator, and the like. Because of the corrosive nature of the reaction, glass-lined equipment is preferred. Stress-relieved austenitic stainless steel and high-nickel alloys such as Inconel can also be used.

The product, i.e., the bis[beta(N,N - dimethylamino) alkyl]ether can be recovered by standard procedures. For example, a useful procedure is to first strip off excess dimethylamine and solvent under reduced pressure. A 50 percent aqueous solution of sodium hydroxide is then added. The alkali takes up the halide ion, and the product is liberated as an upper organic liquid layer. Benzene can then be added to facilitate separation and to subsequently act as an azeotroping agent to dry the product. After drying the product, benzene is stripped off at atmospheric pressure and the residue is distilled under reduced pressure through a short column. The product is then obtained as the distillate.

The examples which follow illustrate various aspects of the invention.

EXAMPLE 1

Preparation of the bis-methochloride of bis[2-(N,N-dimethylamino)ethyl]ether (in aqueous solution)

Di(2-chloroethyl)ether, redistilled (357.6 g.; 2.5 moles) and trimethylamine, aqueous 40 percent (1108 g.; 7.5 moles) were heated at 50° C. for 15 hours in a 3-liter, stainless steel, stirred autoclave. The maximum autogenous pressure developed during this operation was 45 p.s.i.g.

The resulting solution was stripped of excess of trimethylamine by heating it up to 40° C. while a stream of dry nitrogen was sparged through it. Stripping was stopped when the pH of the solution had been reduced to 7.0 to 7.5. The stripped solution contained 4.96 (theory 5.0) equivalents of chloride ion (by Volhard).

EXAMPLE 2

Interaction of dimethylamine and the bis-methochloride of bis[2-(N,N-dimethylamino)ethyl]ether Forty percent of the stripped solution produced in Example 1 [equivalent of 1.0 mole of di(2-chloroethyl) ether] was diluted to a total weight of 728 g. by the addition of water and this solution was introduced into a 3-liter, stainless steel, stirred autoclave. The free space was purged of air with nitrogen after which anhydrous dimethylamine (180.3 g.; 265 cc.; 4.0 moles) was added.

The mixture was heated until the indicated pressure was 300 p.s.i.g. and thereafter for a total of 5 hours at temperatures sufficient to maintain a constant autogenous pressure of 300 p.s.i.g. The reaction temperature was gradually increased from 159° C. at the beginning to about 170° C. at the end of the heating period.

Trimethylamine and excess of dimethylamine were stripped from the resulting aqueous solution by heating it to a maximum of 60° C. while a stream of dry nitrogen was passed through it. Water was then distilled off at reduced pressure (50 mm.) with a maximum kettle temperature of 60° C. until the volume of the solution was reduced to about 250 cc.

Addition of 240 g. (3 moles) sodium hydroxide as an aqueous 50 percent solution, with stirring, to the cooled concentrate liberated crude bis(2 - dimethylaminoethyl) ether as a brown liquid upper layer. During the neutralization the temperature of the mixture was kept below 70° C.

Benzene (250 cc.) was added to the mixture to facilitate separation of the upper layer and also to reduce its water content. The upper layer was then separated and refluxed through a short column (having an efficiency of about 5 theoretical plates) surmounted by a decanting head until all the water had been removed. Most of the benzene was then stripped from the dried solution.

Distillation of the residue (118.3 g.) at 10 mm. through a column having an efficiency of about 4 theoretical plates gave bis(2-dimethylaminoethyl)ether as a colorless liquid (105.6 g.) of boiling point 71–72° C.

The product had a total alkalinity and tertiary amine content of 12.39 and 12.40 meq./g., respectively, and $n_D^{20}$ 1.4288. The theoretical value for the total alkalinity and tertiary amine content is 12.48 meq./g.

The yield, based on di(2-chloroethyl)ether, was 66 percent.

EXAMPLE 3

Preparation of the bis(1-methyl-2-dimethylaminoethyl)ether in aqueous solution

Dichloroisopropyl ether, redistilled (171.1 g.; 1.0 mole) and trimethylamine, aqueous 40% (443.0 g.; 3 moles) are heated at 50° C. for 100 hours in a 3-liter, stainless steel stirred autoclave.

The resulting solution is stripped of excess trimethylamine by heating it up to 40° C. while a stream of dry nitrogen is sparged through it. Stripping is stopped when the pH of the solution has been reduced to 7.0 to 7.5.

EXAMPLE 4

Preparation of bis(1-methyl-2-dimethylaminoethyl)ether: Interaction of dimethylamine and the bis-methochloride of bis(1-methyl-2-dimethylaminoethyl)ether The stripped solution of Example 3 is diluted to a total weight of 728 g. by the addition of water, and this solution is introduced into a 3-liter, stainless steel, stirred autoclave. The free space is purged of air with nitrogen after which anhydrous dimethylamine (180.3 g.; 265 cc.; 4.0 moles) is added.

The mixture is heated until the indicated pressure is 300 p.s.i.g. and thereafter for a total of 5 hours at temperatures sufficient to maintain a constant autogenous pressure of 300 p.s.i.g.

Trimethylamine and excess of dimethylamine are stripped from the resulting aqueous reaction mixture by heating it to a maximum of 60° C. while a stream of dry nitrogen is passed through it.

Water is then distilled off at reduced pressure (50 mm.) with a maximum kettle temperature of 60° C. until the volume of the solution is reduced to about 250 cc. Addition of 240 g. (3 moles) sodium hydroxide as an aqueous 50 percent solution, with stirring, to the cooled concentrate liberates crude bis(1-methyl-2-dimethylaminoethyl)ether as a brown liquid upper layer.

Benzene (250 cc.) is added to the mixture to facilitate separation of the upper layer and also to reduce its water content. The upper layer is then separated and refluxed through a short column (having an efficiency of about 5 theoretical plates) surmounted by a decanting head until all of the water has been removed. Most of the benzene is then stripped from the dried solution.

Distillation of the residue at 12 mm. through a column having an efficiency of about 7 theoretical plates gives bis-(1-methyl-2-dimethylaminoethyl)ether as a colorless liquid having a boiling point of 81–87° C.

EXAMPLES 5–11

By procedures analogous to those described in Examples 1 and 2, a series of reactions were carried out wherein bis[2-(N,N-dimethylamino)ethyl]ether was prepared. The conditions used in the preparations of the bis-methochlorides were essentially the same as those described in Example 1. Table 1, below, displays the various conditions employed in the second reaction step (analogous to Example 2).

In the first reaction step of the invention, trimethylamine is reacted with bis(beta-haloalkyl)ether to produce the bis-methohalide of bis[beta(dimethylamino)alkyl]-ether. If triethylamine is used instead of trimethylamine, the product is the bis-ethohalide of bis[beta(diethylamino)alkyl]ether. If this bis-ethohalide is then reacted with dimethylamine in accordance with the second reaction step of the invention, the product is a mixture which includes bis[beta(dimethylamino)alkyl]ether. The reaction that occurs here can be viewed as the displacement of a

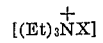

moiety by a $[(CH_3)_2N]$ moiety. Thus, the use of triethylamine in the first reaction step of the invention is the equivalent of the use of trimethylamine in that step.

What is claimed is:

1. Process which comprises reacting dimethylamine with the bis-methohalide of bis[beta(N,N-dimethylamino)alkyl]ether, wherein the halogen of the halogen-substituted ether is selected from the group consisting of chlorine, bromine and iodine, at an elevated temperature of from about 75° C. to about 300° C. and under super-atmospheric pressure of at least 50 p.s.i.g. for a period of time sufficient to produce bis[beta(N,N-dimethylamino)-alkyl]ether wherein the alkyl moiety contains up to about 3 carbon atoms.

2. Process which comprises reacting dimethylamine with the bis-methochloride of bis[beta(N,N-dimethylamino)alkyl]ether in proportions of at least 2 moles of dimethylamine per mole of said ether, in an aqueous medium, at a temperature of at least about 75° C., and at a pressure of at least about 50 p.s.i.g., for a period of time sufficient to produce bis[beta(N,N-dimethylamino)alkyl]-ether, and subsequently recovering the bis[beta(N,N-dimethylamino)alkyl]ether thus produced wherein the alkyl moiety contains up to about 3 carbon atoms.

3. Process which comprises reacting dimethylamine with the bis-methochloride of bis[2-(N,N-dimethylamino)ethyl]ether in proportions of at least 4 moles of dimethylamine per mole of said ether, in an aqueous medium, at a temperature within the range of about 140° to about 200° C., and at an autogenous pressure of from about 200 to about 300 p.s.i.g., for a period of time sufficient to produce bis[2-(N,N-dimethylamino)ethyl]ether, and subsequently recovering the bis[2-(N,N-dimethylamino)ethyl]ether thus produced.

4. Process which comprises the steps of:
  (a) reacting trimethylamine with bis(beta-haloalkyl) ether in an aqueous medium for a period of time sufficient to produce the bis-methohalide of bis[beta-(N,N-dimethylamino)alkyl]ether, wherein the halogen of the halogen-substituted ether is selected from the group consisting of chlorine, bromine and iodine, and
  (b) reacting dimethylamine with the product of step (a) at an elevated temperature of from about 75° C. to about 300° C. and under super-atmospheric pressure of at least 50 p.s.i.g. for a period of time sufficient to produce bis[beta(N,N-dimethylamino)alkyl]ether wherein the alkyl moiety contains up to about 3 carbon atoms.

TABLE I.—PREPARATION OF BIS(2-DIMETHYLAMINOETHYL)ETHER FROM DI(2-CHLOROETHYL)ETHER

[Interaction of aqueous dimethylamine and the bis-methochloride of bis (2-dimethylaminoethyl)ether at 300 p.s.i.g (¹).]

| Example No. | Mole ratio of dimethylamine to bis-methochloride | Moles of bis-methochloride employed | Ratio of water to dimethylamine in parts by weight | Reaction time, hr. | Reaction temperature, °C. | Yield of $[(CH_3)_2NCH_2CH_2]_2O$, Percent |
|---|---|---|---|---|---|---|
| 5 | 10 | 0.4 | 1.16:1.00 | 1.25 | 146–150 | 43.4 |
| 6 | 10 | 0.4 | 1.16:1.00 | 2.0 | 152–157 | 67.5 |
| 7 | 10 | 0.4 | 1.16:1.00 | 5.0 | 160–185 | 65.4 |
| 8 | 4 | 1.0 | 2.58:1.00 | 2.25 | 156–173 | 58.8 |
| 9 | 4 | 1.0 | 2.58:1.00 | 3.75 | 164–184 | 56.2 |
| 10 | 4 | 0.5 | 2.58:1.00 | 3.9 | 182–185 | 41.5 |
| 11 | 4 | 1.0 | 2.58:1.00 | 5.0 | 159–172 | 66.0 |

¹ Reactions were carried out in a 3-liter, stainless steel stirred autoclave.

5. Process which comprises the steps of:
(a) reacting trimethylamine with bis(beta-chloroalkyl)ether in an aqueous medium and at a temperature within the range of from about 25° C. to about 75° C. for a period of time sufficient to produce the bis-methochloride of bis[beta(N,N-dimethylamino)alkyl]ether,
(b) reacting dimethylamine with the product of step (a) in proportions of at least 2 moles of dimethylamine per mole of said product of step (a), in an aqueous medium, at a temperature of at least about 75° C., and at a pressure of at least about 50 p.s.i.g., for a period of time sufficient to produce bis[beta-(N,N-dimethylamino)alkyl]ether, and
(c) subsequently recovering the product of step (b) wherein the alkyl moiety contains up to about 3 carbon atoms.

6. Process which comprises the steps of:
(a) reacting trimethylamine with bis(2-chloroethyl)-ether in proportions of at least 2 moles of trimethylamine per mole of said ether, in an aqueous medium and at a temperature of from about 40° to about 60° C., for a period of time sufficient to produce the bis-methochloride of bis[2 - (N,N-dimethylamino)ethyl]ether,
(b) reacting dimethylamine with the product of step (a) in proportions of at least about 4 moles of dimethylamine per mole of product of step (a), in an aqueous medium, at a temperature within the range of about 140° to about 200° C., and at an autogeneous pressure of from about 200 to about 300 p.s.i.g., for a period of time sufficient to produce bis[2-(N,N-dimethylamino)ethyl]ether, and
(c) subsequently recovering the product of step (b).

References Cited
UNITED STATES PATENTS

| | | | |
|---|---|---|---|
| 2,692,286 | 10/1954 | Stayner | 260—567.6 |
| 1,005,217 | 10/1911 | Hofmann et al. | 260—567.6 XR |
| 2,775,617 | 12/1956 | Shapiro et al. | 260—567.6 |
| 2,807,614 | 9/1957 | Lane | 260—567.6 |
| 2,826,582 | 3/1958 | Miller | 260—567.6 XR |
| 2,951,787 | 9/1960 | Cicero et al. | 260—567.6 XR |
| 2,960,535 | 11/1960 | Bylsma | 260—567.6 |

FLOYD D. HIGEL, *Primary Examiner.*